United States Patent
Meyer et al.

(10) Patent No.: US 12,185,066 B2
(45) Date of Patent: *Dec. 31, 2024

(54) INTELLIGENT AUDIO SYSTEM USING MULTIPLE SENSOR MODALITIES

(71) Applicant: Shure Acquisition Holdings, Inc., Niles, IL (US)

(72) Inventors: Christopher Meyer, Libertyville, IL (US); Daniel Aaron Law, Glencoe, IL (US); Avinash K. Vaidya, Riverwoods, IL (US); Steven Norman Leib, Evanston, IL (US); Mark Swiderski, Gurnee, IL (US); David Grant Cason, Palatine, IL (US); Brent Robert Shumard, Mount Prospect, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/177,665

(22) Filed: Mar. 2, 2023

(65) Prior Publication Data

US 2023/0319470 A1 Oct. 5, 2023

Related U.S. Application Data

(63) Continuation of application No. 17/302,489, filed on May 4, 2021, now Pat. No. 11,617,035.
(Continued)

(51) Int. Cl.
*H04R 3/00* (2006.01)
*H04L 12/18* (2006.01)
(Continued)

(52) U.S. Cl.
CPC ......... *H04R 3/005* (2013.01); *H04L 12/1827* (2013.01); *H04R 1/406* (2013.01); *H04R 27/00* (2013.01); *H04R 2430/20* (2013.01)

(58) Field of Classification Search
CPC ........ H04R 3/005; H04R 1/406; H04R 27/00; H04R 2430/20
(Continued)

(56) References Cited

U.S. PATENT DOCUMENTS

| 4,610,024 A | 9/1986 | Schulhof |
| 5,386,478 A | 1/1995 | Plunkett |

(Continued)

FOREIGN PATENT DOCUMENTS

| CN | 202077158 | 12/2011 |
| CN | 102348148 | 2/2012 |

(Continued)

OTHER PUBLICATIONS

International Search Report and Written Opinion for PCT/US2021/070506 dated Nov. 4, 2021, 19 pp.
(Continued)

*Primary Examiner* — Disler Paul
(74) *Attorney, Agent, or Firm* — Neal, Gerber & Eisenberg LLP

(57) ABSTRACT

Embodiments include an audio system comprising an audio device, a speaker, and a processor. The audio system is configured to receive data from one or more sensors corresponding to persons in a room and/or characteristics of a room, and responsively take action to modify one or more characteristics of the audio system, share the information with other systems or devices, and track data over time to determine patterns and trends in the data.

18 Claims, 4 Drawing Sheets

Related U.S. Application Data

(60) Provisional application No. 63/019,912, filed on May 4, 2020.

(51) Int. Cl.
*H04R 1/40* (2006.01)
*H04R 27/00* (2006.01)

(58) Field of Classification Search
USPC .................................... 381/91–92, 122, 56
See application file for complete search history.

(56) References Cited

U.S. PATENT DOCUMENTS

| | | | |
|---|---|---|---|
| 5,940,118 | A | 8/1999 | Van Schyndel |
| 6,696,633 | B2 | 2/2004 | Miyagishima |
| 7,489,784 | B2 | 2/2009 | Yoshino |
| 8,081,776 | B2 | 12/2011 | Haulick |
| 8,082,051 | B2 | 12/2011 | Mihelich |
| 8,363,848 | B2 | 1/2013 | Huang |
| 8,401,489 | B2 | 3/2013 | Schmidt |
| 8,503,685 | B2 | 8/2013 | Kulkarni |
| 9,197,974 | B1 | 11/2015 | Clark |
| 9,293,151 | B2 | 3/2016 | Herbig |
| 9,330,654 | B2 | 5/2016 | Nicholson |
| 9,560,460 | B2 | 1/2017 | Chaikin |
| 9,641,947 | B2 | 5/2017 | Loether |
| 9,748,913 | B2 | 8/2017 | Kim |
| 10,129,674 | B2 | 11/2018 | Sheen |
| 10,499,152 | B2 | 12/2019 | Rabinowitz |
| 10,530,917 | B2 | 1/2020 | Every |
| 10,721,580 | B1 | 7/2020 | Hoffmann |
| 10,734,965 | B1 | 8/2020 | McPherson |
| 10,741,193 | B1 | 8/2020 | McCowan |
| 10,750,304 | B2 | 8/2020 | McPherson |
| 10,764,699 | B1 | 9/2020 | Rule |
| 10,896,093 | B2 | 1/2021 | Rodriguez Bravo |
| 10,939,202 | B2 | 3/2021 | Stoltze |
| 11,109,173 | B2 | 8/2021 | Po |
| 11,194,998 | B2 * | 12/2021 | Koishida ............... G06F 3/017 |
| 11,785,328 | B2 * | 10/2023 | Williams ............... G06N 3/045 |
| | | | 382/103 |
| 2002/0196951 | A1 | 12/2002 | Tsai |
| 2004/0263636 | A1 | 12/2004 | Cutler |
| 2009/0197534 | A1 | 8/2009 | Stenberg |
| 2010/0177178 | A1 | 7/2010 | Burns |
| 2013/0163748 | A1 | 6/2013 | Khanduri |
| 2013/0190041 | A1 * | 7/2013 | Andrews ............... H04S 7/308 |
| | | | 455/556.1 |
| 2014/0064513 | A1 | 3/2014 | Behringer |
| 2017/0188140 | A1 * | 6/2017 | Duzinkiewicz ........ H04R 3/005 |
| 2020/0077219 | A1 | 3/2020 | Sheen |

FOREIGN PATENT DOCUMENTS

| | | |
|---|---|---|
| CN | 108462921 | 8/2018 |
| JP | H10136498 | 5/1998 |
| JP | 2016116001 | 6/2016 |
| WO | 2000059110 | 10/2000 |
| WO | 2017201868 | 11/2017 |
| WO | 2018206093 | 11/2018 |

OTHER PUBLICATIONS

Invitation to Pay Additional Fees for PCT/US2021/070506 dated Sep. 13, 2021, 13 pp.
Tashev, "Gain Self-Calibration Procedure for Microphone Arrays," Proceedings of International Conference for Multimedia and Expo ICME 2004, 4 pp.

* cited by examiner

INTELLIGENT AUDIO SYSTEM USING MULTIPLE SENSOR MODALITIES

CROSS REFERENCE TO RELATED APPLICATIONS

This application is a continuation of U.S. patent application Ser. No. 17/302,489, filed on May 4, 2021, which claims the benefit of U.S. Provisional Patent Application No. 63/019,912, filed on May 4, 2020. The contents of these applications are incorporated herein by reference in their entirety.

TECHNICAL FIELD

This application generally relates to an audio system located in a room, such as a conference room. In particular, this application relates to the use of multiple sensor modalities to control the audio system, determine room information, and optimize the audio system over time.

BACKGROUND

Conferencing environments, such as conference rooms, boardrooms, video conferencing applications, and the like, can involve the use of microphones for capturing sound from various audio sources active in such environments. Such audio sources may include humans speaking, for example. The captured sound may be disseminated to a local audience in the environment through amplified speakers (for sound reinforcement), and/or to others remote from the environment (such as via a telecast and/or a webcast).

The operational characteristics of the microphones (e.g., lobe direction, gain, etc.) may depend on factors such as the locations of the audio sources, physical space requirements, aesthetics, room layout, and/or other considerations. These factors may be analyzed in order to improve the operation of the audio system. However, as these factors change over time, the operation of the audio system may be sub-optimal if it does not adapt to the changing circumstances.

Some businesses include multiple conference rooms which may be shared by employees. Each conference room may have particular characteristics, such as a maximum capacity, room layout, furniture layout, air conditioners or other noise generating sources, and more. Each room may have different characteristics than the other room(s).

Accordingly, there is an opportunity for an audio system that addresses these concerns. More particularly, there is an opportunity for an audio system that can adapt to changes over time, can assist with optimizing the use of multiple different conference rooms over time, and can track sensor data over time.

SUMMARY

The invention is intended to solve the above-noted problems by providing an audio system that is designed to, among other things: (1) integrate with various sensors and information sources, including non-audio based sensors; (2) enable detection of room specific characteristics in both real-time, and over a longer period of time; (3) enhance and/or automate various microphone and/or speaker tuning functions; (4) share detected information with other systems and devices; and (5) track sensor data over time to improve sensor operation, improve data extraction, and otherwise improve the operation of the audio system.

In one example, an audio system comprises an audio device comprising a microphone, a non-acoustic sensor coupled to the audio device and configured to provide sensor data, and a processor communicatively coupled to the audio device and the non-acoustic sensor. The processor is configured to receive audio data from the microphone, receive the sensor data from the non-acoustic sensor, determine, based on the audio data and the sensor data, that an event has occurred, and responsive to determining that the event has occurred, apply one or more adjustments to signal processing of audio input to the microphone or a pick-up pattern of the microphone.

In this example, the non-acoustic sensor may comprise a camera, the event may comprise the detection of an input audio signal, and the processor may be further configured to determine whether the input audio signal comprises a desirable input audio signal or noise, based on both the audio data from the microphone and the sensor data from the camera. The processor may further be configured to, responsive to determining that the input audio signal comprises a desirable input audio signal, apply a first adjustment to the signal processing or the pick-up pattern of the microphone, and responsive to determining that the input audio signal comprises noise, apply a second adjustment to the signal processing or the pick-up pattern of the microphone, wherein the second adjustment is different from the first adjustment. The second adjustment may comprise changing a direction of the pick-up pattern of the microphone to exclude the source of the input audio signal. Further, the processor may also be configured to determine, based on the audio data from the microphone, a confidence level corresponding to a first determination whether the input audio signal comprises a desirable input audio signal or noise based, and modify the confidence level based on the sensor data from the camera. Modifying the confidence level may include increasing confidence in a noise determination if the sensor data from the camera indicates that a source of the input audio signal comprises a noise source, and increasing confidence in a desirable input audio signal determination if the sensor data from the camera indicates that the source of the input audio signal comprises a desirable audio source.

In this first example, the non-acoustic sensor may comprise a camera, the event may comprise the detection of a first person, and the processor may be further configured to dedicate a first audio channel to the first person, and determine a first position of the first person based on the sensor data from the camera, and responsively direct a pick-up pattern of the microphone corresponding to the first audio channel to cover the first person in the first position. The processor may be further configured to determine, based on the sensor data from the camera, that the first person has moved from the first position to a second position, and responsively change the direction of the first pick-up pattern to cover the first person in the second position.

In this first example, the non-acoustic sensor may comprise a camera, the event may comprise the detection of a head of a first person, and the processor may be further configured to determine an orientation and position of the head of the first person relative to the microphone, wherein applying the one or more adjustments to the signal processing of the audio input to the microphone comprises either (1) modifying one or both of an equalization and an automatic gain control of the microphone based on the determined orientation and position of the head of the first person, or (2) selecting a second audio device including a second microphone that is better positioned to capture an input audio signal from the first person, based on the determined orientation and position of the head of the first person.

In this first example, the non-acoustic sensor may comprise a camera, the event may comprise the detection of an input audio signal based on the audio data from the microphone and the detection of a potential source of the input audio signal based on the sensor data from the camera, the audio system may further comprise an IR sensor, and the processor may be further configured to perform one or more additional actions. These additional actions may include determining, based on IR sensor data from the IR sensor corresponding to the potential source of the input audio signal, that the potential source of the input audio signal is a person located within a room also including the IR sensor, and responsively enabling the pick-up pattern of the microphone to include the potential source of the input audio signal.

In a second example, an audio system comprises an audio device comprising a microphone, wherein the audio device is positionable in a room. The audio system also comprises a non-acoustic sensor coupled to the audio device and configured to provide sensor data. The audio system further comprises a processor communicatively coupled to the audio device and the non-acoustic sensor, the processor configured to perform one or more actions. The processor is configured to receive audio data from the microphone, receive the sensor data from the non-acoustic sensor, determine, based on one or both of the audio data and the sensor data, that an event has occurred, responsive to determining that the event has occurred, determine one or more acoustic characteristics of the room based on both the audio data and the sensor data, and modify an operational characteristic of the audio device based on the one or more acoustic characteristics of the room.

In this second example, the non-acoustic sensor may comprise a camera, and the event may comprise the detection of a changed configuration of the room based on the sensor data from the camera, the changed configuration of the room comprising one or both of a changed dimension of the room or a changed position of an object in the room. The processor may be further configured to determine updated acoustic characteristics of the room based on both the audio data from the microphone and the sensor data from the camera, and modify an operation characteristic of the audio device based on the updated acoustic characteristics of the room.

In this second example, the non-acoustic sensor may comprise a camera, and the event may comprise the determination of a material of a wall of the room or a material of an object in the room based on the sensor data from the camera. The processor may be further configured to determine updated acoustic characteristics of the room based on both the audio data from the microphone and determined material, and modify an operation characteristic of the audio device based on the updated acoustic characteristics of the room.

In this second example, the non-acoustic sensor may comprise a radar sensor, and the event may comprise the detection of a changed configuration of the room based on the sensor data from the radar sensor, the changed configuration of the room comprising one or both of a changed dimension of the room or a changed position of an object in the room. The processor may be further configured to determine updated acoustic characteristics of the room based on both the audio data from the microphone and the sensor data from the radar sensor, and modify an operation characteristic of the audio device based on the updated acoustic characteristics of the room.

In this second example, the non-acoustic sensor may comprise an environmental sensor, and the event may comprise the detection of a change in an environmental condition of the room based on the sensor data from the environmental sensor. The processor may be further configured to determine updated acoustic characteristics of the room based on both the audio data from the microphone and the sensor data from the environmental sensor, and modify an operation characteristic of the audio device based on the updated acoustic characteristics of the room.

In this second example, the audio system may further comprise a plurality of audio devices, the non-acoustic sensor may comprise an ultra-wideband sensor, and the event may comprise a detection of a change to one or more of the plurality of audio devices. The processor may be further configured to determine, for one or more of the plurality of audio devices, respective positions relative to the ultra-wideband sensor based on the sensor data from the ultra-wideband sensor, determine a subset of the plurality of audio devices based on the determined positions of the one or more audio devices, determine updated acoustic characteristics of the room based on audio data from the subset of the plurality of audio devices, and modify an operation characteristic of the audio device based on the updated acoustic characteristics of the room.

In a third example, an audio system may comprise an audio device comprising a microphone, a non-acoustic sensor coupled to the audio device and configured to provide sensor data, and a processor communicatively coupled to the audio device and the non-acoustic sensor. The processor may be configured to receive audio data from the microphone, receive the sensor data from the non-acoustic sensor, determine, based on one or both of the audio data and the sensor data, that an event has occurred, responsive to determining that the event has occurred, determine a position of one or more objects in a room based on the sensor data, and apply one or more adjustments to signal processing of audio input to the microphone or a pick-up pattern of the microphone based on the position of the one or more objects in the room.

In this third example, the non-acoustic sensor may comprise a camera, and the event may comprise the detection of a plurality of potential input audio sources, wherein the one or more objects comprise the plurality of potential input audio sources. The processor may be further configured to determine the position of each of the plurality of potential input audio sources based on the sensor data from the camera, and cause the pick-up pattern of the microphone to include a plurality of lobes, each lobe directed to the position of one of the plurality of potential input audio sources, wherein the number of lobes corresponds to the number of potential input audio sources.

In this third example, the non-acoustic sensor may comprise an inertial measurement unit coupled to a mobile device of a potential input audio source, and the event may comprise the detection of movement of the mobile device based on the sensor data from the inertial measurement unit, wherein the one or more objects comprise the mobile device. The processor may be further configured to determine the position of the mobile device of the potential input audio source based on the sensor data from the inertial measurement unit, and direct the pick-up pattern of the microphone toward the position of the mobile device.

In this third example, the non-acoustic sensor may comprise a Bluetooth sensor configured to communicate with a mobile device of a potential input audio source, and the event may comprise the detection of movement of the mobile device based on the sensor data from the Bluetooth sensor, wherein the one or more objects comprise the mobile device. The processor may be further configured to determine the position of the mobile device of the potential input audio source based on the sensor data from the Bluetooth sensor, and direct the pick-up pattern of the microphone toward the position of the mobile device. In some examples, the processor is further configured to perform one or more actions responsive to establishment of a connection of the mobile device to the Bluetooth sensor, the one or more actions comprising initializing one or more devices of the audio system, and starting a meeting scheduled to occur in the room. This can be done based on a determination of who is in the room, and for what purpose each person is in the room, which are in turn determined in part based on the Bluetooth connection of each person's mobile device.

In this third example, the non-acoustic sensor may comprise a camera, and the event may comprise the detection of movement of a potential input audio source from a first position to a second position, wherein the one or more objects comprise the potential input audio source. The processor may be further configured to determine the first position and the second position of the potential input audio source based on the sensor data from the camera and the audio data from the microphone, cause movement of the pick-up pattern of the microphone from a first direction covering the first position to a second direction covering the second position of the potential input audio source, and cause movement of a field of view of the camera from a first direction including the first position to a second direction including the second position of the potential input audio source.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
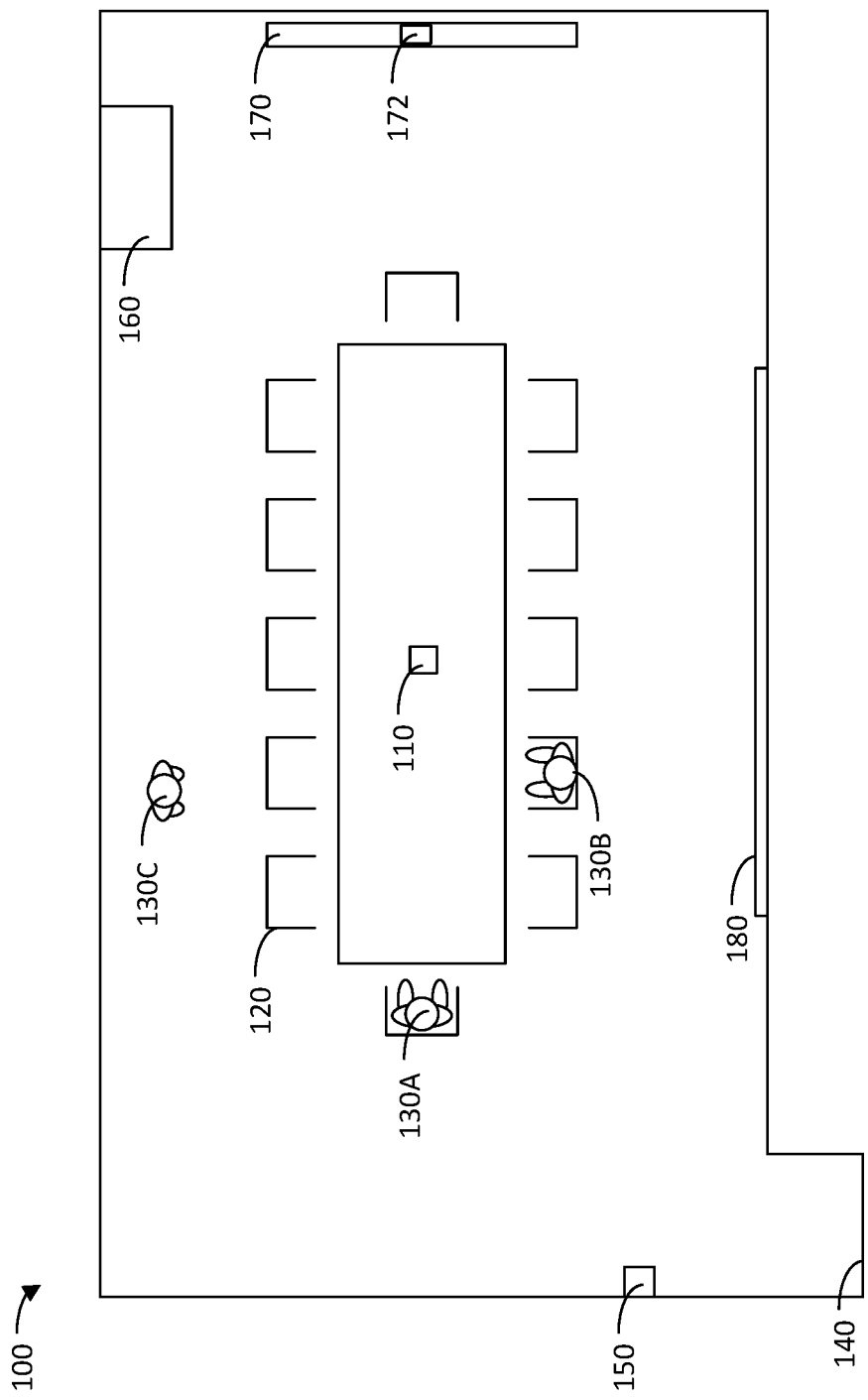
FIG. 1 is a simplified plan view of an example conference room including an audio system according to embodiments of the present disclosure

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

In embodiments of the present disclosure, an audio system may include a microphone as well as one or more additional sensor modalities or information sources which may be termed a "non-acoustic sensor" (i.e., visual, tactile, infrared, etc.). The microphone and information from the other sensors or information sources can be combined into a single integrated audio device, or communicatively coupled in an audio system. In some examples, the microphone and the non-acoustic sensor may be uncoupled from each other, and may each provide information to a third device or system, which may act on the information from one or both of the microphone and the non-acoustic sensor and send control information back to one or both of the microphone and the non-acoustic sensor. Data from the microphone and/or additional sensors or information sources can be processed to detect specific classes of events and characteristics of a room. Detected events and characteristics can then be processed to determine specific classes of outcomes and actions to be taken in response, thereby enabling optimization of the audio system.

For instance, data from two or more different types of sensors may be combined to increase the confidence level of a determination that a certain event has occurred (e.g., whether a person entered a room for a scheduled meeting). In one example, enterprise data regarding the usage schedule of a room and the participants who are listed as attending a given meeting can be combined with camera data from a camera view of that room at a particular time to determine various information, and improve confidence in the determined information. The data from multiple sources can be combined to increase the confidence level in a determination that a particular person (e.g., the person who scheduled the meeting) has entered the room, that all scheduled participants of the meeting are present, that the meeting is in progress, that the meeting was moved or postponed (e.g., by detecting no one in the room), and more. It should be appreciated that this is one example, and that various other examples and combinations of sensors and sensor types can be used to make various other determinations.

Specifically, an example audio system may receive data from one or more sensors, and determine a likelihood or confidence value associated with certain events, actions, or characteristics. Multiple different sensors, sensor types, and sensor modalities may be used to improve the confidence of sensed information, so as to improve the performance of the audio system. For instance, in one example an IR sensor and an acoustic sensor can be used together to determine a person's position within a room. The combined data from the IR sensor and the acoustic sensor can be used to determine whether a person is sitting in a chair, standing, or in some other position, as well as a confidence level corresponding to that determination. In a second example, both an IR sensor and a Bluetooth sensor can be used to gather information, such as by using the IR sensor to detect the presence of a person in a room (e.g., via body heat), and using a Bluetooth pairing to determine a likely identity of the person (based on the paired device) that is present. In a third example, both a camera and a temperature sensor can be used at the same time to gather information about the room. The camera may detect the presence of one or more people in a room, and the temperature sensor may be used to determine whether an A/C unit is likely to be turned on. If there are people in the room and the A/C unit is likely to be turned on, one or more actions can be taken to prepare for and/or mitigate the noise caused by the A/C unit. These are just three examples of the combinations of sensors and sensor types that can be used. It should be understood that many more combinations of two, three, or more sensors and sensor types, and information source (such as enterprise information about scheduled meeting times) can be used to gather information and take various actions such as those disclosed herein.

As noted in the examples above, the sensor combinations may include (1) enterprise information about a scheduled meeting and a camera positioned in the scheduled room, (2) an IR sensor and an acoustic sensor, (3), an IR sensor and a Bluetooth sensor, and (4) a camera and a temperature sensor. It should be understood that many more combinations and permutations of sensors are possible and included within the scope of this disclosure, even though they may or may not be explicitly listed.

In some examples, data from the various sensors may be combined to build a "knowledge base" that grows over time as new information gets added. This knowledge base may then be used in real time, and over longer periods of time, to cause various outcomes to occur. The outcomes may generally fall into four categories, as detailed below.

The first category of outcome includes enhancing or automating manual microphone or speaker tuning functions of the audio system. Enhancing or automating the tuning functions reduces configuration workloads typically performed by the user, in addition to improving the audio system's ability to extract high quality audio and associated metadata from a room in which the audio system is placed. Enhancing or automating tuning functions can take the form of directing microphone lobes toward a desired signal, or away from a non-desired signal, modifying a gain, bandwidth, or other signal characteristic, and more.

The second category of outcome that can be determined or carried out based on the received sensor data and/or other information is extracting room information from the room in which the audio system is located, and sharing that information with other systems and devices. In some examples, the sensor data and/or information can be collected to determine one or more characteristics of the room. For example, the data can be used to determine how many people are in the room, what the people are doing, a noise floor of the room, the position of an A/C unit in the room, whether there are any threats in the room, gestures that indicate or require an alert or workflow, a pattern of presence of people over time, how many people talk during these time frames, and more. This information can then be shared with other systems or devices, for example through an API. The other systems or device can then take various other appropriate actions based on the gathered data.

The third category of outcome based on the gathered sensor data includes tracking and analyzing information over time to learn and adapt to patterns and trends. Patterns and trends in the data may form over time, such as patterns of use of the room, patterns of user positioning, patterns of where the human speaker is typically located, and more. These patterns may be analyzed and used to improve the sensor and audio system operation.

The fourth category of outcome based on the gathered sensor data includes extracting human voice from a noisy environment in real time. The data from the various sensors can be used to improve the microphone operation, so as to reduce noise and improve the ability of the audio system to detect and isolate a human speaker's voice.

To accomplish these outcomes, an example audio system may include a microphone and/or or speaker positioned in a housing, and one or more non-audio based sensors and/or information sources which may either be supported by the housing, or separate from the housing but communicatively coupled to a processor of the audio system. In some examples, the housing may be configured to protect and structurally support the microphone, speaker, and/or one or more additional sensors. The housing may include a sound-permeable face made of fabric, film, wire mesh, or other suitable material, and an enclosed rear face made of metal, plastic, or other suitable material. The housing may be a substantially flat, square housing, however other sizes and shapes are also contemplated, including, for example, domed shapes, spherical shapes, parabolic shapes, oval or circular shapes, or other types of polygons (e.g., rectangle, triangle, pentagon, etc.).

In some embodiments, the housing may be configured for attachment to a ceiling or ceiling tile so that the microphone faces down towards or over the listeners in a room or other environment. For example, the housing may be placed over a conference table, may include a speaker, and may be used to reproduce an audio signal representing speech or spoken words received from a remote audio source associated with the conferencing environment. As another example, the housing may be placed in an open office environment, above a cluster of cubicles or other suitable location. In a preferred embodiment, the housing may be flush mounted to the ceiling or other surface to gain certain acoustic benefits, such for example, infinite baffling. The housing can be further configured for optimal performance at a certain height, or range of heights, above a floor of the environment, for example, in accordance with standard ceiling heights (e.g., eight to ten feet high), or any other appropriate height range (e.g., ceiling to table height). In other embodiments, the housing is configured for attachment to a vertical wall for directing audio towards the listeners from one side of the environment.

Figure 2:
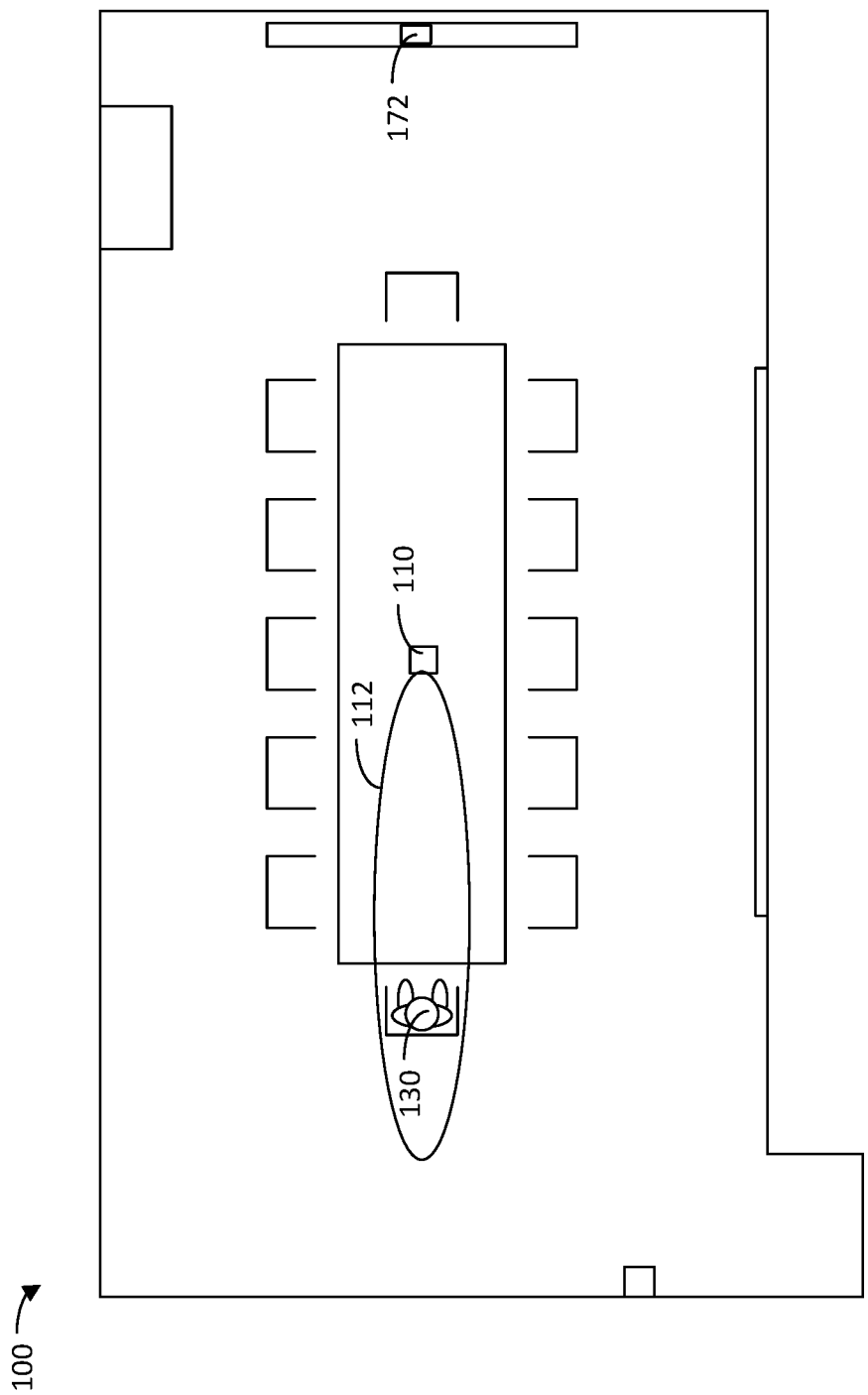
FIG. 2 is another simplified plan view of an example conference room including an audio system according to embodiments of the present disclosure.

Although the Figures, particularly FIGS. 1 and 2, illustrate a single microphone and/or speaker device (e.g., a single unit which may include a single microphone or an array of microphones), other embodiments may include multiple microphone and/or speaker devices, or an array of microphone and/or speaker devices. As an example, in some cases, two microphone devices may be placed side-by-side within one area or room. In other cases, four microphone devices may be placed respectively in the four corners of a space or room.

To gather data, the audio device (e.g., a microphone, speaker, or combination of the two) of the audio system may include one or more sensors, and/or may be communicatively coupled with one or more sensors and/or information sources. The sensors may be all the same type of sensor (e.g., multiple cameras) or may be two or more different types of sensors (e.g., a camera and an IR sensor) all operating together to gather information. The sensors can be integrated with the housing, or may stand alone separate from the housing. The sensors can be positioned inside the room in which the audio system operates, or may be positioned outside the room.

As a non-exhaustive list, the sensors and/or information sources can include, for example, (1) motion sensors, configured to gather information about whether movement is detected, where movement is detected, and any other suitable information related to movement, (2) Bluetooth sensors, configured to detect a pairing between devices, distances between devices, relative angle of devices, and more, (3) cameras, configured to gather visual data included in a respective field of view, (4) infrared sensors, configured to detected infrared light, (5) RADAR and/or LIDAR sensors, configured to detect objects in and/or map aspects of the room in which the audio system is located (6) sound emitters or "chirp sensors," configured to emit sound which can be used to emit and receive sound pulses, (7) WiFi sensors, configured to detect device connections as well as various signals characteristics (e.g., strength, noise, etc.), (8) accelerometers, configured to detect movement and orientation, (9) temperature, humidity, barometric, and other such sensors, configured to detected the atmospheric conditions of a given room or environment, (10), GPS sensors, configured to determine location information, (11) enterprise signals, such as calendar information, scheduling information, room dimensions, room occupancy information, and various other information, and (12) any other suitable sensor configured to gather information pertaining to a given room, the room contents, the room occupants (or expected occupants), and more.

The sensor data can then be analyzed to determine whether one or more events or actions have occurred or are expected to occur. The sensor data may be analyzed using machine learning, such that over time the analysis improves. In some examples, an event or action may be determined to have occurred with a certain confidence level based on data from a first set of sensors. A second set of sensors may also be used to determine if the event or action has occurred, so as to improve the confidence level associated with the event or action. This can include, for example, determining a confidence level that an action has occurred based on motion sensor data, and then confirming and increasing the confidence level based on data from a camera. Other combinations are possible as well.

In some embodiments, the sensor data can be analyzed to determine a confidence value associated with (1) actions specific to persons in the room, (2) room characteristics, (3) objects in the room, and (4) other noise sources.

In some examples, the data can be used to determine whether a given person in the room is, for example, (a) sitting, (b) standing, (c) entering the room, (d) leaving the room, (d) walking, (e) gesturing, (f) drawing on a whiteboard or chalkboard, (g) speaking, (h) eating, (i) sleeping, (j) arguing, (k) fighting, (l) sentimental (m) emotional, (n) the current human speaker, (o) the chairman or chairwoman, (p) an audience member, (q) asking a question, (r) signaling a desire to ask a question, and (s) various other actions or states associated with a person.

Each of these personal events or actions can be determined by the sensor data by, for example, capturing visual information of the person and performing image recognition. For example, images that indicate movement of a person from one side of the room to another can indicate that the person is walking. If the images indicate that the person is no longer in the room, that can indicate that the person has left the room. Image recognition is not the only sensor data that can be used. As noted above, various other sensors can be used. Motion sensors can indicate when a person enters the room. Over time, it may be determined that the "head" of the table is where the chairman or chairwoman typically sits. When a person is located at the head of the table (e.g., person 130A in FIG. 1), there may be a confidence value associated with the event that the person is the chairman or chairwoman.

In some examples, non-visual data may be used to determine one or more of the events or actions noted above. For example, calendar information may indicate that person A is the meeting organizer, and that persons B and C are "optional" attendees. When person A enters the room, a Bluetooth sensor may pair with person A's phone. The Bluetooth sensor might also determine that person A is located at the head of the table based on a signal strength calculation, angle of arrival calculation, or other determination (particularly where there are two or more Bluetooth antennas in the room). The combination of person A's positioning, status as the meeting organizer, and Bluetooth pairing can provide a confidence value that person A is the chairman or chairwoman of the meeting and has a relatively high importance. The audio system may then determine to prioritize audio from person A, or take one or more other actions, such as those discussed in further detail below.

In some examples, the sensor data can be used to determine various characteristics of the room. The room characteristics can include, for example, (a) dimensions of the room, (b) materials of the room, (c) acoustic properties of the room, (d) changes to the dimensions, materials, and acoustics of the room, and more.

In one example, a conference room may include false or movable walls, that can change the size of the room by moving from a first configuration to a second configuration. One or more sensors, such as a camera, IR sensor, or other suitable sensor may be used to determine whether the walls of the room are positioned in the first configuration, the second configuration, or in some other configuration. And based on these determinations, dimensions of the room can be determined. In another example, a chirp sensor or sound emitter may be used to determine acoustic properties of, for instance, the walls of the room. The chirp sensor may emit a sound, which then reflects off the walls of the room. The resulting sound is then received by the microphone, and the delays and acoustic shape of response signals can be analyzed to determine acoustic properties of the room, such as the material of the walls.

In some examples, the sensor data can be used to determine various objects present within the room. The objects can include, for example, (a) tables, (b) chairs, (c) walls, (d) doors, (e) windows, (f) stairs, (g) whiteboards, (h) chalkboards, (i) computers and computer accessories, (j) papers, (k) wastepaper baskets, (l) food and drink, (m) lab equipment, (n) animals, and more.

In one example, a plurality of chairs may be positioned in a room. One or more sensors may be used to determine the chair positions within the room. For example, a camera may be used to determine that first and second chairs are positioned at a table in the middle of the room, while third and fourth chairs are stored at a side wall of the room. The audio system may use this information to prioritize steering the microphone toward the first and second chairs, since it is more likely that a human speaker in the room will be positioned at the table than along the wall. In another example, one or more sensors may be used to determine the presence and location of one or more computers (e.g., laptops) positioned in the room, and particularly on the table. These computers may impact the audio system's ability to extract speech from a person, particularly when the computer is positioned between the person and the microphone. When the position of the computer is known, the audio system can compensate for the distortion or interference cause by the computer.

In some examples, the sensor data can be used to determine various other noise sources within the room. The noise sources can include, for example, (a) air conditioners, (b) heating devices, (c) fans, (d) noisy food items (e.g., chip bags, wrappers), (e) papers, (f) doors and more.

In one example, the position of an A/C unit within the room can be determined based on sensor data. Further, ambient temperature and weather information can be determined based on other sensor data, or received by the audio system from an outside source. The position of the A/C unit combined with the ambient temperature information can enable the audio system to determine a likelihood that the A/C unit turns on at any given time. In response, the audio system can compensate for the noise caused by the A/C unit by steering away from the A/C unit, or otherwise compensating for the added noise.

In response to the determination of the various events, actions, room characteristics, and more noted above, the audio system may be configured to take various actions or produce various outcomes. As noted above, the outcomes fall into four general categories: (1) enhancing or automating microphone and/or speaker tuning functions, (2) extracting room information for use by other systems and devices, (3) tracking and analyzing data over time to improve audio system operation, and (4) extracting human voice from a noisy environment in real time.

The first category of outcome includes enhancing and/or automating microphone and/or speaker tuning functions. As noted above, the sensor data can be used to determine various information related to people in the room (e.g., positioning, importance, etc.) as well as properties of the room such as room size, acoustic properties, and more. In response to this information, the audio system may automatically alter or steer microphone and/or speaker patterns or lobes towards the direction of desired acoustic information and/or listeners, and away from undesired acoustic information and/or listeners. For instance, this can include steering the lobes toward human speakers as they move around the room, while steering lobes away from A/C units, chip bags, and more. In some examples, the audio system may turn on, turn off, or gate certain microphone patters or lobes that correspond to particular spatial regions in a room. For instance, microphone and/or speaker beams can be deployed or turned on only when a person speaking or a listener is present. In some examples, the audio system can adjust an overall audio capture area, determine one or more go/no-go zones from which acoustic information is captured or not, and may determine one or more geofences. Still further, in some examples, the audio system may adjust one or more digital signal processing algorithms, volume and/or gain control, echo cancellation, and/or voice list settings based on the sensor data. For instance, the volume may be adjusted based on the distance between a person and the microphone or speaker. Further, the position of a person with respect to the microphone or speaker may be used to drive automatic gain control (AGC) and/or to adjust dynamic head transfer function equalization, particularly for persons who are relatively close to the speaker or microphone. These are only some examples of the various actions that can be taken with respect to tuning functions in response to the sensor data.

The second category of outcome includes extracting room information to be used by other systems and devices. In some examples, the audio system may be located in a conference room of a business that include multiple conference rooms, as well as various other offices, security, and more. The sensor data associated with a given room may be used to determine room usage in real time, which can be shared with other systems or devices. The room usage can be compared to an expected usage, to determine if there are any abnormalities, and to optimize usage of the rooms themselves. In some examples, the sensor data can be used to determine if there is a threat in the room. If a threat is detected, that information can be shared with security personnel so that appropriate actions can be taken. Further, the sensor data can be used to determine if a workflow action should be taken. If a workflow action should be taken, that information can be shared with the appropriate personnel so that the action can be carried out.

The third category of outcome includes tracking and analyzing information over time to learn and adapt to patterns and trends. In some examples, the patterns and trends can relate to the number of people in a room, the pattern of seats which are typically occupied during a meeting, the typical location of speakers in the room, and the number of clusters of people in the room, such that one audio channel can be assigned to each cluster. In some examples, the sensor information can be tracked such that activity and usage patterns enable the audio system to identify preferential acoustic regions, tune go/no-go microphone and/or speaker reception areas, and automatically adapt to changing room characteristics. These patterns and trends can be correlated and compared with expected usage patterns, and shared with other systems and devices to improve their operation, for example through an API.

The fourth category of outcome includes using the sensor data to better extract desired audio information in real time. For example, the sensor data can be used to assist with acoustic echo cancellation, voice lift, and other audio processing techniques designed to improve the operation of the audio system.

As noted above, the system may include determining a confidence level associated with the information gathered by the sensor(s). For example, in a room where a person is detected using a first sensor or information source (e.g., a camera), and a second sensor (e.g., an IR sensor), the system may determine a first confidence level associated with a determination of the person's location based on the camera data, and a second confidence level associated with the determination of the person's location based on the IR sensor. A combined confidence level may be determined using data from both the camera and the IR sensor. OR alternatively, the confidence level may be determine using data from both sensors, without an individual confidence level determination for each sensor. Then, one or more of the actions noted above (e.g., steering a microphone beam toward the person) may be taken if the confidence level is above a particular threshold (e.g., 90%). This is merely one example, and many other combinations of sensors and confidence level thresholds may be used.

Example Scenarios

To illustrate aspects of the audio system described herein, several scenarios are disclosed below. These scenarios should be understood as examples only, and should not be treated as limiting the scope of the disclosure. The scenarios are split into several categories, including (1) room/acoustic characterization, (2) improved audio pickup and noise mitigation, (3) object localization, and (4) general system improvements.

Room/Acoustic Characterization

In a first scenario, the audio system may include a camera, a radar, and/or other functionality that enables the position of devices and objects in the rooms to be determined. The audio system may run a model using the camera and other sensors that can perform image segmentation, which enables the classification and characterization of walls, tables, chairs, etc., in real time. The acoustic quality of the space in which the system operates is highly dependent on the dimensions of the space, the shape of the space, the materials used to create the walls, floors, and ceilings of the space, and many other factors around the construction of the space. It can be tedious to manually measure the acoustic quality of the space in order to know what acoustic qualities need to be adjusted to improve audio quality of audio played in the space. Additionally, even if it is known how to adjust the audio played in a space to correct for acoustic imperfections, most audio systems don't provide the capabilities to make such corrections. In this first scenario, data from the sensors can be used to automatically measure the acoustic quality of the space, and the audio playback and recording can be adjusted accordingly to account for any acoustic imperfections of the space. Multiple sensors may be needed, because each sensor may be good at determining some characteristics while may have certain drawbacks. For instance, a camera sensor can see what objects make up a space (e.g. walls, tables, chairs, etc.) and potentially the type of material these objects are made of (e.g. drywall, carpet, etc.). However, the camera may have difficulty determining exact location details of objects in some circumstances. A second sensor, such as a radar sensor, can determine an accurate location of the objects in the space, but may have difficulty determining the materials of those objects. Other sensors or systems may figure out the location of some objects in a space, some acoustic properties of the space (e.g. frequency response, delay, reverberation time, etc.), and even what some of the objects may be made of, but may struggle when determining what the objects are. By combining multiple sensors, the acoustic quality of the space can be automatically calculated, and appropriate audio processing can be calculated and applied to recording and playback audio to correct for any acoustic imperfections of the space.

In another scenario, information from a camera may be combined with an IR sensor to make certain room characterizations. Where the room includes glass walls or windows, people outside the room may be visible, and the system may have difficulty differentiating between these bystanders outside and people inside the room. Further, where posters or artwork that includes people are present, the system may also have difficulty differentiating. By combining the camera data with IR sensor data, the system may determine the type of walls, may determine the layout of the room, and may detect body heat of persons in the room so as to differentiate between desired targets and undesired targets for the purpose of directing microphone or speaker lobes. For example, the system may be able to differentiate between a person physically in a room from a picture of person or a person behind glass, or some other non-heat emitting source that could be confused to be a person speaking. The IR sensor in this case may provide the means to make this differentiation because the IR sensor can detect the body heat of the person it is trying to locate.

In a further scenario, systems may determine the relative locations of different equipment or may measure the acoustic response of a space. However, when doing this, the user may need to ensure that only equipment that is part of the room being characterized is being used. This can require a tedious manual process to identify which equipment is located in the room being characterized. To address this issue, information from various non-acoustic sensors such as an ultrawideband sensor, Bluetooth sensor, and more can be used to automatically determine what equipment is located in the room being characterized without the use of any acoustic signals. Once the equipment has been identified, the system could use one or more techniques to setup the room without concern that the acoustic signals used for setup are being played on equipment in a room not under test that is potentially already being used for another meeting.

In another scenario, various environmental sensors may be used to gather data, including temperature, humidity, air quality, and more. These sensors may be combined into the microphone, speaker, or other component of the system. Because environmental characteristics have an impact on the acoustic performance of the room and audio system, the system would use this data to automatically correct or account for variations in the temperature, humidity, and more, as they change over time.

In some examples, the determined room and/or acoustic characteristics can be stored and shared, for use by other systems and in other rooms, or for later use in the same room. The audio system can then determine, based on this information, the typical positioning of speakers within a room, the typical positioning of speakers' heads, and more. This information can then be used to suppress audio coming from a door, from an A/C unit, and from other undesirable sources, and emphasize audio from more likely head locations.

Improved Audio Pickup and Noise Mitigation

In another scenario, the audio system may include a microphone array configured to steer the microphone patterns or lobes. The audio system may operate using an algorithm that can detect and locate the source of desired acoustic information, and can point one or more microphone lobes at the source(s). The detection and locating of the audio source can be done using audio information only, however by combining the audio information with a second source of information, such as camera or visual data, microwave or ultrasonic localization devices, and more, a confidence value associated with the determination of the audio source(s) location(s) can be increased. This can enable the audio system to have increased confidence in the location of a human speaker as he or she moves around a room. Further, this can enable simultaneous coverage of multiple talkers with a single channel, by using beam spreading and/or shaping. By using talker position statistics and/or other sensor drive location estimates, two or more talkers can be covered by one channel. A single beam can be shaped or directed toward these collocated talkers, for example through a clustering model. When a single channel is used for multiple talkers, or when fewer channels are used than there are talkers (e.g., 2 channels for 3 talkers), this can reduce processing loads and network traffic. Where one or more processing algorithms are used for each channel, such as Shure's Intellimix, voice activity detection, automatic gain control, acoustic echo cancellation, frequency equalization, and/or noise reduction, the use of fewer beams or channels enables reduced processing for the system.

In some examples, noise sources may often be confused with desired audio sources. Combining visual information from a camera and/or other information from other sensors, the system may differentiate between a real talker and a noise source. In response, the system may perform beam shaping, and/or beam optimization on a beam directed toward a talker, in order to avoid the noise source and reduce the noise picked up by the system. This may include using object detection (i.e., joint classification and localization), head detection, mouth detection, mouth "speaking" detection, noise source object classification and detection, and modeling to correlate (or jointly detect) with audio sound detect, localization, and classification.

In some examples, a camera may be used to perform object detection, to determine whether objects are noise sources or faces (e.g., desired audio sources). The system may then determine one or more auto "keep out" zones where microphone beams are not directed, as well as to perform noise cancellation or noise rejection based on the position of the objects. For example, some people may be identified as undesired talkers, who produce audio that is not desired. These talkers may be treated as noise sources in some circumstances (e.g., when the primary talker is currently speaking). Sensor driven localization of the undesired talkers may be used to localize the source of the undesired audio, in order to remove or reduce the undesired talker using beam shaping, for example. This may be particularly useful when an undesired talker is murmuring nearby a desired talker.

In another scenario, it may be desirable for a primary person (e.g., meeting leader) to have his or her own dedicated audio channel. This may allow for different signal processing or routing for that audio. However, the primary person may stand up, move around, and/or overlap with other people in the room over time. With a statically placed mic lobe, movement of the primary person may bring that person outside the lobe, and may enter a different lobe. And if the primary person switches places with another person, that other person may produce audio that is included in the original static mic lobe (i.e., the static lobe no longer captures the intended person's audio). Automatically placed lobes based on voice localization may not distinguish between individual talkers, so keeping a specific talker in a specific lobe may not be possible. To address these issues, one or more visual sensors, such as a camera, may be used to track the location of individuals, even as they move around the room. With that information, the system can deploy a mic lobe to cover the primary person. The system may then move the mic lobe to follow the primary person as he or she moves around. In some examples, the system may even include a separate audio channel for every person in the room, with that audio channel not changing for the duration of the meeting. This allows for audio from different individuals to be processed differently (e.g., different EQ, gain, signal path/routing, etc.).

In another scenario, it is understood that the frequency content of speech audio varies with the talker's head orientation and position relative to the microphone (e.g., close by, underneath, etc.). To account for this, other sensor data used for localization, including visual data from a camera, for example, may be used to determine the position and/or orientation of a talker's head, and this information may be used to apply appropriate equalization and/or automatic gain adjustment to the input audio of a given talker.

In another scenario, multiple talkers are present in the room. The information from various sensors, including visual information, may be used to improve the accuracy and precision of localization of the talkers. This improved accuracy and precision may enable more accurate steering of beams, as well as better usage of multiple beams. For instance, if two people are positioned near each other, a single beam may be used to cover both people. Or alternatively, two separate beams may be used. The use of additional visual information may improve the ability of the system to localize and place the correct number of beams based on the number of audio sources.

In some examples, the audio system may make use of a pressure sensor and/or proximity sensor in combination with one or more other sensors, in order to determine which lobes should be activated, where the lobes should be directed, and improved localization information. The system may activate a particular lobe only when a person is located in close proximity.

In a further example, where speech from a particular talker is dropped (for whatever reason), a visual sensor may be used to perform speech inpainting, based on lip reading and voice parameterization.

Object Localization

In another scenario, it is desirable to perform localization for objects in the room (e.g., chairs, computers, talkers, chip bags, other noise sources, etc.). Localization using purely audio sensors may provide some information. However, by using non-acoustic sensors such as a camera, improved accuracy and confidence can be gained. Localization based on a camera image, with the camera placed in a different location in the room, with a field-of-view covering the same portion of the room as the microphone, could be combined with the audio localization results. Doing this improves the accuracy over doing either type of localization individually. The camera, because it is viewing from a different angle, would improve the depth accuracy of the audio localization.

In some examples, localization may be performed automatically by the system. It can be difficult to determine the location of all equipment and people in a room, and therefore difficult to determine where to direct microphone and speaker lobes. By combining several sensors (e.g. ultrawideband, cameras, etc.) into audio conferencing equipment (e.g. microphones, speakers, DSP processing boxes, etc.) that will already exist in a conferencing space anyway, the precise location of all equipment and people in a space can be automatically determined without the need for additional equipment in the room. Since it is determined automatically via the information provided by the sensors, it also saves time on pre-work during installation and can adapt to the space as the space changes over time. In one example, inertial measurement units (IMUs) such as accelerometers, gyroscopes, magnetometers, compasses, and more, may be used in combination with one or more other sensors (e.g., camera, ultra-wideband), in order to determine the orientation of objects (e.g., via IMUs), position (e.g., via ultra-wideband (UWB)), and the confidence of these determination can be improved through the use of camera data. In another example, GPS or other indoor positioning information may be used to determine the position of various equipment or objects.

In another example, some objects in room can be localized using a camera as well as acoustic sensors, and/or Bluetooth sensors. The camera may provide a two-dimensional position fairly accurately, but may struggle with providing depth. Acoustic localization may provide three-dimensional position information, but may depend on how many microphones and speakers there are. Bluetooth localization may provide three-dimensional position information, but may depend on how many Bluetooth devices there are present. By combining all the sensors together, localization accuracy is increased without any additional specialized localization equipment. Similarly, in addition to or instead of the information noted above, an IMU associated with one or more objects can provide orientation information, a pressure sensor can provide elevation information, and one or more other sensors can provide two-dimensional position information. By combining multiple sensors, localization accuracy is improved.

In another scenario, it may be desirable when installing or starting a system to localize all devices in the room. However, before this localization is performed, it may be desirable to know which devices are located in the room, vs. those that are not located in the room but are still connected to the system (e.g., devices in a multi-room conference room, or conference rooms that are nearby each other). To deal with this issue, the system may include using a proximity sensor to determine which devices are located nearby (e.g., Bluetooth sensor, UWB, etc.). These sensors may have the ability to penetrate walls to a certain extent, and as such may not be used on their own to determine which devices should be used for localization. To address this, the system of the present disclosure may begin an acoustic localization procedure with only those device determined by the first step (e.g., via proximity), and confirm which of the proximate devices are located in the same room. The localization process can then proceed only with those devices that are located in the room.

In some examples, it may be desirable to localize the devices associated with people in the room (e.g., phones, laptops, etc.). In this case, the system may include RFID detection, in combination with one or more other sensors (e.g., ultra-wideband), in order to precisely localize various devices.

General System Improvements

In a further scenario, various audio system functionality may be improved or added based on the presence of one or more acoustic or non-acoustic sensors. For example, each sensor may gather data continuously, or at some interval, which can be used by the audio system itself to improve its operation, and/or may be shared with other systems or devices to improve their operation as well. This can enable a user to forecast or predict room usage, ensure that resources are being used efficiently, detect anomalies or causes for concern, direct security or other personnel to the source of a problem, and more.

In one example, a camera may be used in connection with microphones and/or speakers of the audio system to visualize the position of lobes. The system may place and augmented reality image of the lobes overlaid on the camera image, to illustrate to a user where the lobes are located. The sensor information and visualization may also be used to determine and indicate the optimal location for wireless microphones.

In some examples, such as a teleconference, a camera may be used. The system of the present disclosure may use one or more sensors to choose which person in the video frame to focus on, and/or cause the camera to move as the person moves. Further, an IR sensor may be used to maintain or provide framing of a particular person or object in the video frame even when the lights are turned out.

In some examples, it may be desirable for the system to be controllable using multiple different modes (e.g., speech, visual, etc.). The system of the present disclosure may include a camera for capturing gestures, which may or may not be combined with audio data (e.g., input speech) to control the system.

In some examples, the system may operate in a "sleep mode" under some circumstances, and may be required to "wake up" prior to providing full functionality. The system may include a camera that can identify a person physically located in the room, which may be used to wake up the system. Alternatively or additionally, the camera may be used in connection with a Bluetooth or other sensor, to identify the presence of the person, and to authenticate or determine the identity of the person, so as to wake up the system only when certain people enter the room (e.g., a person scheduled to use a given meeting room). In other examples, the system may include a wake word or wake gesture.

In some examples, the system may use information from various sensors to determine whether a threat is present. This can include combining visual information from a camera with audio information, in order to determine that a threat is present. An alert can then be sent to an appropriate party to address the threat.

In some examples, the system may operate in an outdoor environment (e.g., a professional golf tournament). It can be difficult to wire devices in this environment. In this case, a drone or unmanned aerial vehicle may be used, equipped with one or more microphones or speakers to capture audio from desired sources, even where they are spaced far apart.

In other examples, it may be desirable to determine the status of a given room in which the system is placed. Any one of the associated sensors may be used to gather information, and the information may be accessed via an API to determine, for example, a number of people present in the room, their locations, object locations, the identity of people or objects, what the people are doing or saying over time and in real time, etc.

In another example, if the system includes a microphone array, it can be difficult to detect that a microphone in the array has failed. The system of the present disclosure may address this issue by creating a signal that can be used as a local test source to determine whether one or more microphones in the array have failed.

Example System

FIG. 1 illustrates a room 100 in which one or more components of the audio system 110 of the present disclosure may be located. The audio system 110 may include a microphone positioned in the middle of a table of the room 100. FIG. 1 also shows a plurality of chairs 120 positioned around the table, and first, second, and third persons 130A, 130B, and 130C. The room 100 also includes a door 140, a motion sensor 150, and A/C unit 160, a television screen 170 with a camera 172, and a whiteboard 180. As noted above, the audio system 110 may include various sensors, or may be communicatively coupled to the sensors, such as the motion sensor 150 and the camera 172.

FIG. 2 illustrates the room 100, but with only a single person 130 positioned at the head of the table. In the example shown in FIG. 2, the camera 172 may detect the position of the person 130 in the room, and the audio system 110 may responsively steer the lobe 112 toward the person 130.

Figure 3:
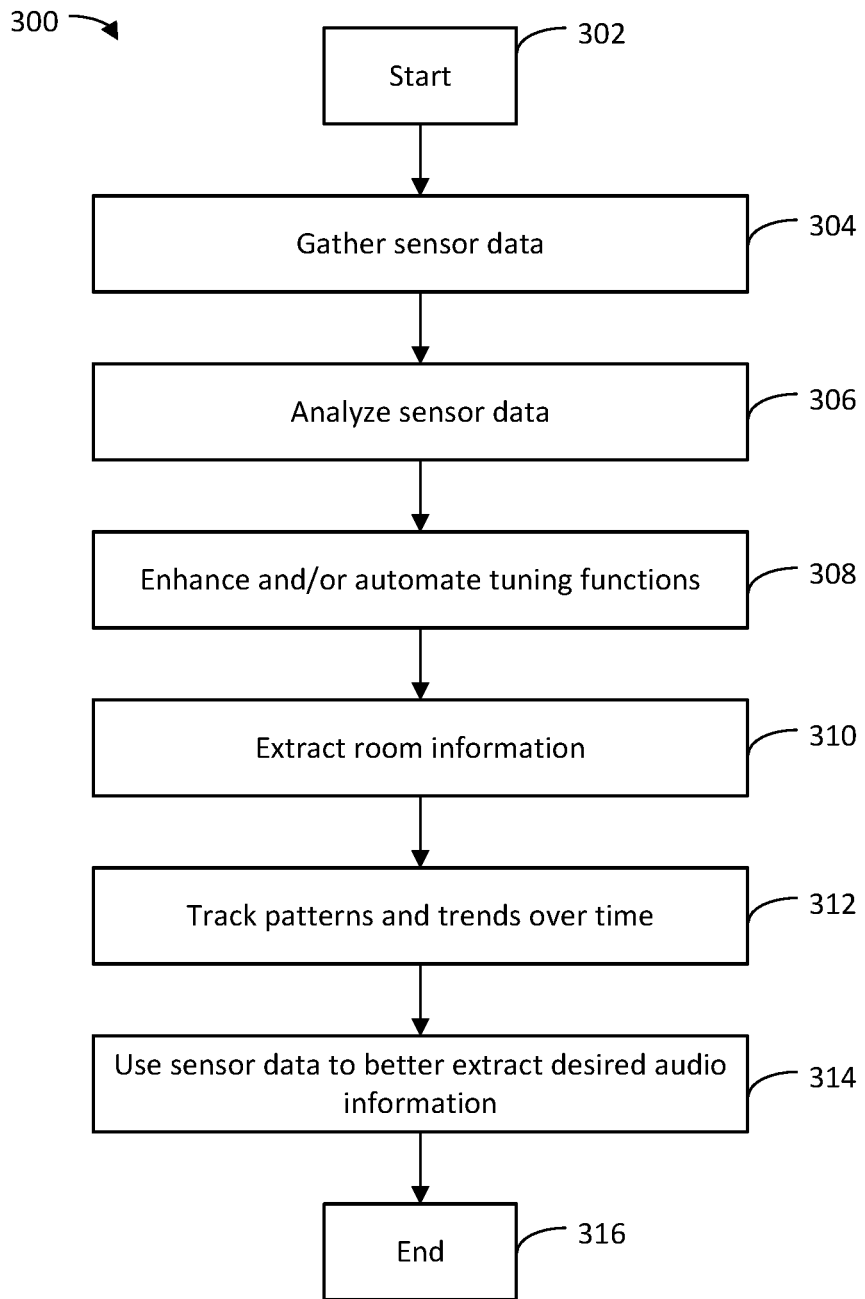
FIG. 3 is a flowchart illustrating an exemplary method of operating an audio system of the present disclosure.

FIG. 3 illustrates a flowchart of an example method 300 of performing various actions based on sensor data received by an audio system, according to embodiments of the present disclosure. All or portions of the method 300 may be performed by one or more processors and/or other processing devices (e.g., analog to digital converters, encryption chips, etc.) within or external to the audio system (such as, e.g., audio system 100 shown in FIGS. 1 and 2). In addition, one or more other types of components (e.g., memory, input and/or output devices, transmitters, receivers, buffers, drivers, discrete components, logic circuits, etc.) may also be utilized in conjunction with the processors and/or other processing components to perform any, some, or all of the steps of the method 300.

The method 300 begins at step 302. At step 304, method 300 includes gathering sensor data. This can include any of the sensors or sensor types disclosed herein, as well as any other suitable sensor. In some examples, the sensors are non-audio sensor.

At step 306, method 300 includes analyzing the sensor data gather by the sensors. This can include analyzing the sensor data in real time, as well as storing the sensor data and analyzing stored sensor data to determine trends or patterns over time. Furthermore, analyzing the sensor data can include determining whether one or more events or actions have occurred, such as determining the locations of persons in a room, determining who the human speaker is, determining acoustics of the room, and more.

At step 308, method 300 may include enhancing or automating the tuning functions of the audio system. As noted above, this can include steering microphone patterns or lobes, turning on, off, or gating various lobes, modifying signal processing algorithms, and more.

At step 310, method 300 may include extracting room information. This can include using the sensor data to determine room dimensions, materials, acoustics, and more.

At step 312, method 300 may include tracking patterns and trends over time. As noted above, this can include storing sensor data over time to develop a timeline which can be analyzed to detect and patterns or trends. This information can then be used to optimize the audio system, as well as being shared with other systems or devices to improve their operation as well.

At step 314, method 300 may include using the sensor data to better extract desired audio information. This can include making adjustments to the audio system in real time to better differentiate between desired audio from an audio source, and undesired audio. This can include, for example, suppressing noise from an A/C unit, while emphasizing audio from a speaker.

Method 300 may then end at step 316. Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

Figure 4:
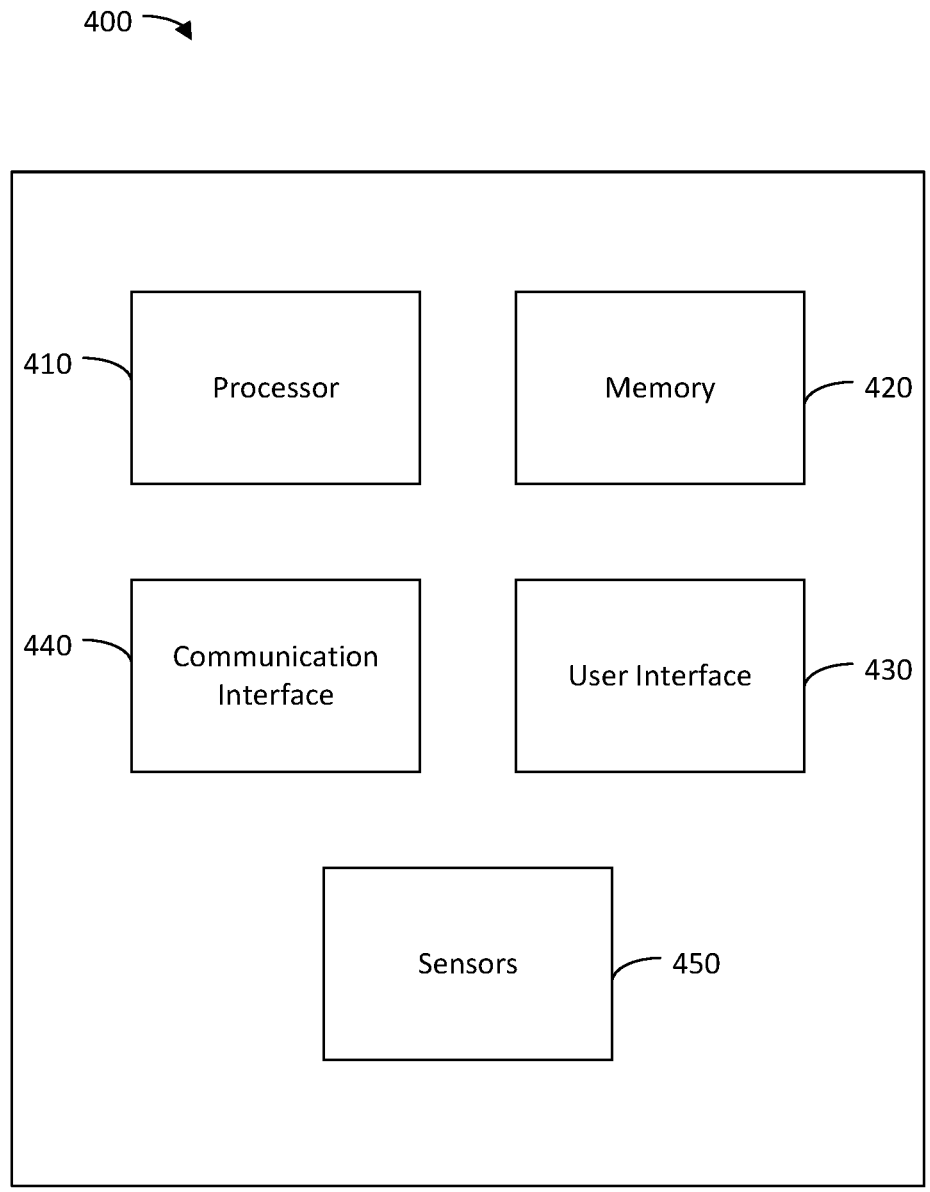
FIG. 4 is a simplified block diagram showing various electronic components of the audio system of the present disclosure.

FIG. 4 illustrates a simplified block diagram of example electronic components of an audio system of the present disclosure. The audio system 400 may be configured for performing a variety of functions or acts, such as those described in this disclosure (and accompanying drawings). The computing device 400 may include various components, including for example, a processor 410, memory 420, user interface 430, communication interface 440, and one or more sensors 450. It should be understood that examples disclosed herein may refer to audio systems having components that may or may not be physically located in proximity to each other. Certain embodiments may take the form of cloud based systems or devices, and the term "audio system" should be understood to include distributed systems and devices (such as those based on the cloud), as well as software, firmware, and other components configured to carry out one or more of the functions described herein. Further, as noted above, one or more features of the audio system 400 may be physically remote and may be communicatively coupled to the audio system, via the communication interface 440 for example.

Processor 410 may include a general purpose processor (e.g., a microprocessor) and/or a special purpose processor (e.g., a digital signal processor (DSP)). Processor 410 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 420 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 420 includes multiple kinds of memory, particularly volatile memory and non-volatile memory.

The memory 420 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 420, the computer readable medium, and/or within the processor 410 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

User interface 430 may facilitate interaction with a user of the audio system 400. As such, user interface 430 may include input components such as, buttons, knobs, sliders, a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 430 may also comprise devices that communicate with inputs or outputs, such as a short-range transceiver (RFID, Bluetooth, etc.), a telephonic interface, a cellular communication port, a router, or other types of network communication equipment. The user interface 430 may be internal to the audio system 400, or may be external and connected wirelessly or via connection cable, such as through a universal serial bus port.

In some cases, the user interface 430 includes a control panel coupled to a control device or processor of the audio system 400, the control panel including one or more switches, dimmer knobs, buttons, and the like. In other cases, the user interface 430 may be implemented using a software application executed by a processor of the audio system 400 and/or a mobile or web application executed by a processor of a remote device communicatively coupled to the audio system 400 via a wired or wireless communication network. In such cases, the user interface 430 may include a graphical layout for enabling the user to change filter values, delay values, beamwidth, and other controllable parameters of the audio system 400 using graphical sliders and buttons and/or other types of graphical inputs. The remote device may be a smartphone or other mobile phone, laptop computer, tablet computer, desktop computer, or other computing device configured to enable remote user control of the audio system 400. In some embodiments, the audio system 400 includes a wireless communication device (not shown) (e.g., a radio frequency (RF) transmitter and/or receiver) for facilitating wireless communication with the remote device (e.g., by transmitting and/or receiving RF signals).

Communication interface 440 may be configured to allow the audio system 400 to communicate with one or more devices (or systems) according to one or more protocols. In one example, the communication interface 440 may be a wired interface, such as an Ethernet interface or a high-definition serial-digital-interface (HD-SDI). As another example, the communication interface 440 may be a wireless interface, such as a cellular, Bluetooth, or WiFi interface. In some examples, the communication interface may include one or more antennas, and may be configured to transmit and receive RF signals.

Sensors 450 may be any suitable sensor, such as those noted in this disclosure including, for example, a camera, an IR sensor, a motion sensor, and more.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An audio system comprising:
an audio device comprising a microphone;
a non-acoustic sensor configured to provide sensor data, wherein the non-acoustic sensor comprises at least one of an infrared sensor or a radar sensor; and
one or more processors communicatively coupled to the audio device and the non-acoustic sensor, any of the one or more processors configured to:
receive audio data from the microphone;
receive the sensor data from the non-acoustic sensor;
determine, based on the audio data and the sensor data, that an event has occurred, wherein the event comprises a detection of a potential input audio source;
responsive to determining that the event has occurred:
determine one or more of an orientation or a position of a talker based on the sensor data, wherein the talker comprises the potential input audio source; and
change a direction of a pick-up pattern of the microphone based on one or more of the orientation or the position of the talker; and
determine whether multiple talkers are present, based on the sensor data.

2. The audio system of claim 1, wherein any of the one or more processors is configured to change the direction of the pick-up pattern of the microphone to include the talker.

3. The audio system of claim 1, wherein any of the one or more processors is configured to change the direction of the pick-up pattern of the microphone to exclude the talker.

4. The audio system of claim 1, wherein any of the one or more processors is further configured to change the direction of the pick-up pattern of the microphone to include the multiple talkers.

5. The audio system of claim 1, wherein any of the one or more processors is further configured to determine one or more of an orientation or a position of each of the multiple talkers based on the sensor data.

6. The audio system of claim 1, wherein any of the one or more processors is further configured to transmit one or more of the orientation or the position of the talker to a camera in communication with any of the one or more processors to cause the camera to point towards the talker.

7. The audio system of claim 1, wherein any of the one or more processors is further configured to determine a confidence level related to whether the potential input audio source is the talker or a noise, based on the audio data and the sensor data.

8. The audio system of claim 1, wherein any of the one or more processors is further configured to modify a parameter of the microphone based on the one or more of the orientation or the position of the talker.

9. An audio system comprising:
an audio device comprising a microphone;
a non-acoustic sensor configured to provide sensor data, wherein the non-acoustic sensor comprises at least one of an infrared sensor or a radar sensor; and
one or more processors communicatively coupled to the audio device and the non-acoustic sensor, any of the one or more processors configured to:
receive audio data from the microphone;
receive the sensor data from the non-acoustic sensor;
determine, based on the audio data and the sensor data, that an event has occurred, wherein the event comprises a detection of a potential input audio source;
responsive to determining that the event has occurred:

determine one or more of an orientation or a position of a talker based on the sensor data, wherein the talker comprises the potential input audio source; and transmit one or more of the orientation or the position of the talker to a camera in communication with any of the one or more processors to cause the camera to point towards the talker; and determine whether multiple talkers are present, based on the sensor data.

10. The audio system of claim 9, wherein any of the one or more processors is further configured to change a direction of a pick-up pattern of the microphone based on one or more of the orientation or the position of the talker.

11. The audio system of claim 9, wherein any of the one or more processors is further configured to change a direction of a pick-up pattern of the microphone to include the multiple talkers.

12. The audio system of claim 9, wherein any of the one or more processors is further configured to determine one or more of an orientation or a position of each of the multiple talkers based on the sensor data.

13. The audio system of claim 12, wherein any of the one or more processors is further configured to transmit one or more of the orientation or the position of one or more of the multiple talkers to the camera to cause the camera to point towards the one or more of the multiple talkers.

14. The audio system of claim 9, wherein any of the one or more processors is further configured to determine a confidence level related to whether the potential input audio source is the talker or a noise, based on the audio data and the sensor data.

15. The audio system of claim 9, wherein any of the one or more processors is further configured to modify a parameter of the microphone based on the one or more of the orientation or the position of the talker.

16. The audio system of claim 9, wherein any of the one or more processors is further configured to:
determine a change in one or more the orientation or the position of the talker, based on the sensor data; and
responsively transmit one or more of the changed orientation or the changed position of the talker to the camera.

17. An audio system comprising:
an audio device comprising a microphone;
a non-acoustic sensor configured to provide sensor data; and
one or more processors communicatively coupled to the audio device and the non-acoustic sensor, any of the one or more processors configured to:
receive audio data from the microphone;
receive the sensor data from the non-acoustic sensor;
determine, based on one or both of the audio data and the sensor data, that an event has occurred;
responsive to determining that the event has occurred, determine one or more acoustic characteristics of a room based on both the audio data and the sensor data; and
modify an operational characteristic of the audio device based on the one or more acoustic characteristics of the room.

18. The audio system of claim 17, wherein the non-acoustic sensor comprises at least one of an infrared sensor or a radar sensor, and wherein the event comprises a detection of a change in an orientation or a position of a potential input audio source.

* * * * *